UNITED STATES PATENT OFFICE 2,152,512

1,5,5-ALKYL-SUBSTITUTED BARBITURIC ACIDS

Ernest H. Volwiler, Highland Park, and Donalee L. Tabern, Lake Bluff, Ill., assignors to Abbott Laboratories, North Chicago, Ill., a corporation of Illinois No Drawing. Application June 17, 1933, Serial No. 676,404

10 Claims. (Cl. 260—33)

Our invention relates broadly to derivatives of barbituric acid having sedative, anaesthetic, and soporific properties, and has to do more particularly with compounds having the general formula:

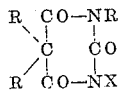

in which the R's represent saturated or unsaturated alkyl groups, at least one of which is a secondary or tertiary alkyl group, and X represents hydrogen, and alkali metal, an alkali earth metal, or a primary or secondary amine.

It is well known that barbituric acid derivatives of the general formula:

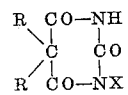

where R represents an alkyl or aryl group, and X represents hydrogen or substitute therefor, are in some cases valuable hypnotics and sedatives; it is also known that certain compounds of the general formula:

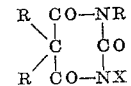

wherein the R's may be all alkyl groups, or one of them an aryl and the other two alkyl groups, possess in some instances marked hypnotic activity. In general, however, compounds of this type have been found by various investigators to be less active and more toxic than the corresponding barbituric acid derivatives in which the hydrogen on the nitrogen atom is unsubstituted; furthermore, certain higher members of the series tend to produce excitement, paraplegia, and convulsions.

Up to the present, to our knowledge, no compound of the general formula:

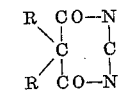

in which at least one R represents a secondary or tertiary alkyl group, the other R's representing saturated or unsaturated alkyl groups, has been described. We have prepared a large number of such compounds which we believe to be new, and have discovered that in general these compounds are surprisingly rapid in action, producing sleep of short duration; their toxicity in comparison with the effective dose is low, and they do not have the undesirable side effects shown by the closely related compounds mentioned above.

PREPARATION

These barbituric acids may be prepared by several methods, of which the following are examples:

(1) A dialkyl substituted cyanacetic ester is condensed with an alkyl urea by means of sodium ethylate and the resultant imino barbiturate is boiled with dilute sulphuric acid. Within a short time, the reaction has occurred and crystals or oily droplets of the desired tri-substituted barbituric acid compound begin to separate and are removed and purified. The reaction is as follows:

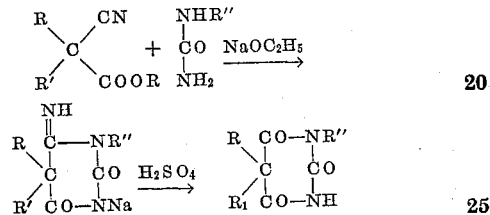

Examples I, VI, VIII and IX illustrate this method.

(2) Reaction of a dialkyl malonic ester with the appropriate substituted urea in the presence of sodium alcoholate at elevated temperature:

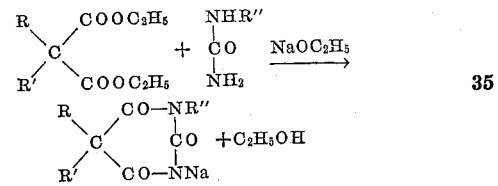

Examples II, III and IV illustrate this method.

(3) Action of an alkyl halide, particularly where the alkyl group is unsaturated in the gamma-delta position, on the metal derivative of a barbituric acid compound substituted in the 1,5 positions:

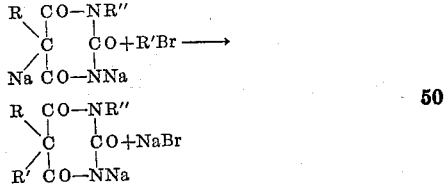

Examples V and VII illustrate the above method.

Example I

*Methyl (1-ethyl propyl) N-methyl barbituric acid*

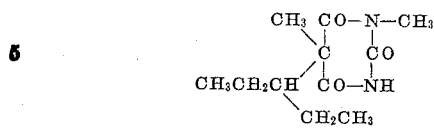

199 grams of methyl (1-ethyl propyl) cyanacetic ester and 115 grams of methyl urea are added to a solution prepared by dissolving 69 grams of sodium in 200 cc. absolute alcohol. The material is refluxed for several hours, the alcohol is removed, the residue taken up in water and precipitated by the addition of acid in the usual manner. 20 grams of the imino methyl (1-ethyl propyl) N-methyl barbituric acid so obtained is dissolved in about 100 cc. of 15 per cent sulphuric acid and refluxed for several hours. After cooling, the oil is separated, dissolved in alkali, and precipitated by acid. On standing for several days, it solidifies to a mass of wax-like crystals. Without further treatment, it is converted directly to the sodium salt by adding it to one atomic equivalent of sodium which has been dissolved in a mixture of absolute alcohol and benzene. The solution is filtered and evaporated in vacuo. The resultant sodium salt is white, readily soluble in water and in alcohol, less soluble in benzene or petroleum ether.

Example II

*Methyl (1-methyl butyl) N-methyl barbituric acid*

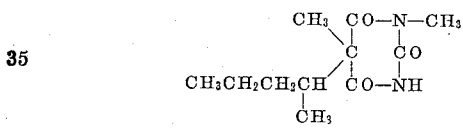

24.6 grams of methyl (1-methyl butyl) malonic ethyl ester is added to a solution of 6.9 grams of sodium and 11.2 grams methyl urea, in absolute alcohol. After several hours of refluxing, the solvent is removed by distillation and the residue heated at approximately 110° C. for one hour. The mixture is cooled, water and ice are added, and the material extracted with benzene, which is rejected. To the residue is added hydrochloric acid in excess; this precipitates a viscous oil which can be distilled at 2 mm. pressure; it boils at 180–200° C. Petroleum ether is added, which causes crystallization to ensue. The crystals are recrystallized from a mixture of benzene and petroleum ether or from kerosene. The crystals melt at 88–90° C.

Example III

*Ethyl (secondary butyl) N-phenyl barbituric acid*

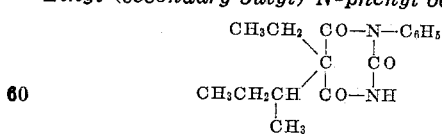

In a similar manner, 75 grams of ethyl (secondary butyl) malonic ester is condensed with 60 grams of phenyl urea by 21 grams sodium in 300 cc. absolute alcohol. The compound so obtained is distilled in vacuo and upon standing sets to a glass-like solid.

Example IV

*Ethyl (1-methyl butyl) N-methyl barbituric acid*

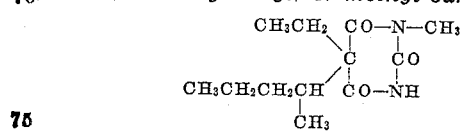

26.1 grams of ethyl (1-methyl butyl) malonic ester is treated with an absolute alcoholic solution of 6.9 grams of sodium and 11.5 grams of methyl urea. After several hours refluxing, the alcohol is distilled off and the residue heated in a bath at 120° C. for four hours. The solid is dissolved in cold water, extracted with benzene, and then acidified with acid, and the oil so obtained is distilled. It boils at 170–180° C. at 4 mm.

Example V

*Ethyl (1-methyl butyl) N-allyl barbituric acid*

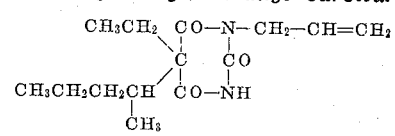

25 grams of the sodium salt of ethyl (1-methyl butyl) barbituric acid is dissolved in 250 cc. water and gently refluxed for four hours with 12 grams of allyl bromide. One-half gram of copper sulphate may be used as a catalyst. The excess bromide is removed by steam distillation and the residual oil dissolved in potassium hydroxide and precipitated by hydrochloric acid. The compound boils at 170–180° C. at 2 mm.

Example VI

*Ethyl (1-ethyl propyl) N-methyl barbituric acid*

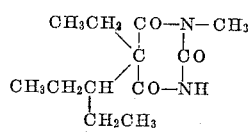

85.6 grams ethyl (1-ethyl propyl) cyanacetic ethyl ester, and 46 grams methyl urea are caused to react in a solution of 28 grams of sodium in absolute alcohol in the manner already described. There is obtained 50 grams of a semi-solid material which is hydrolyzed with dilute sulphuric acid. The ethyl (1-ethyl propyl) N-methyl barbituric acid is purified by distillation. It boils at 180–190° C. at 4 mm. It does not solidify on long standing.

Example VII

*Methyl (1-methyl butyl) N-allyl barbituric acid*

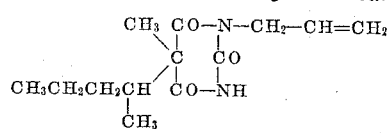

By the method described in Example V, consisting of the action of allyl bromide on the potassium salt of methyl (1-methyl butyl) barbituric acid in aqueous or alcoholic solution, the above acid is obtained. It may be extracted from the unchanged methyl (1-methyl butyl) barbituric acid by extraction with cold petroleum ether. The product boils at 170–190° C. at 6 mm.

Example VIII

*Secondary butyl allyl N-methyl barbituric acid*

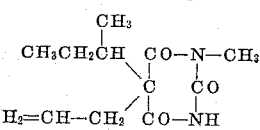

By a method similar to that described in Example I, secondary butyl allyl malonic ester is condensed with methyl urea, and the product isolated in the usual manner. It boils at 180–195° C. at 3 mm.

EXAMPLE IX

*Methyl (1,3 dimethyl butyl) N-methyl barbituric acid*

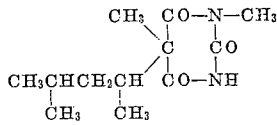

Mono-methyl (1,3 dimethyl butyl) cyanacetic ester is prepared by the reaction of 133 grams of sodium cyanacetic ester with 150 grams of 1,3-dimethyl butyl bromide in alcohol. It boils at 150–160° C. at 40 mm. This ester is then methylated by methyl iodide in alcohol, in the usual manner. The resultant cyanacetic ester (boiling 155–160° at 32 mm.) is condensed as in Example VI with methyl urea and the imino barbiturate hydrolyzed by dilute sulphuric acid. After purification, the barbiturate is distilled and boils at 170–190° at 5 mm.

Any of the barbituric acids mentioned in the specification may be prepared by first making the disubstituted malonic ester or cyanacetic ester and condensing this with the required substituted urea. Where one of the groups on the 5-carbon atom is allyl, these compounds may be prepared by the alternative method of condensing the barbituric acid containing one substituent on the 5-carbon atom, and a substituent on one of the nitrogen atoms, with an allyl halide.

PREPARATION OF SALTS OF THE ABOVE ACIDS

*Alkali metal salts*

Sodium is dissolved in a mixture of absolute alcohol and benzene, and to this is added a molecular equivalent of the barbituric acid. The solution is evaporated to dryness in vacuo, and a quantitative yield of the sodium salt is obtained. Salts of the other alkali metals are similarly produced. The salts so obtained are white solids, somewhat hygroscopic, and readily soluble in water.

The following examples illustrate the preparation of other salts of barbituric acids:

*Alkaline earth salts*

A strong solution of ethyl (1-methyl butyl) N-methyl barbituric acid in a slight excess of ammonium hydroxide solution is treated with a concentrated solution of calcium chloride. A white precipitate of the calcium salt is formed at once and is filtered off. It is moderately soluble in water.

The barium salt may be formed from barium chloride in the same way. It is less soluble than the calcium salt.

A solution of ammonium methyl (1-methyl propyl) N-methyl barbiturate when treated with calcium chloride solution as above, gives a precipitate of the calcium salt which is somewhat more soluble in water, than that in the previous example.

*Amine salts*

Ethyl (1-methyl butyl) N-methyl barbituric acid is dissolved in an excess of diethyl amine; on evaporation in vacuo, the alkylamine salt remains as an oil which readily loses the diethyl amine, reverting to the free barbituric acid.

Diethyl N-tertiary butyl barbituric acid is dissolved in a mixture of high boiling petroleum ether and a small excess of diethyl amine. On evaporation, the salt separates in beautiful snow-like crystals, which also tend to lose the base and revert to the barbituric acid.

Ethyl secondary butyl N-methyl barbituric acid is dissolved in an excess of mono-butylamine; the excess amine is evaporated in vacuo, and the mono-butylamine salt is obtained as an oil, which, as in the case of the diethyl amine salts, tends to lose the mono-butylamine, reverting to the free barbituric acid.

COMPOUNDS OF THIS SERIES PRODUCED BY US

| Compound | Melting point or physical state at room temperature |
|---|---|
| Methyl (1,3-dimethyl butyl) N-methyl | Oil. |
| Ethyl (1-methyl butyl) N-methyl | Do. |
| Ethyl (1-methyl butyl) N-allyl | Do. |
| Ethyl (1-methyl butyl) N-phenyl | Glass-like viscous solid. |
| Methyl (1-methyl butyl) N-methyl | 88–90° C. |
| Methyl (1-methyl butyl) N-tertiary butyl | 108–110° C. |
| Methyl (1-methyl butyl) N-allyl | Oil. |
| Ethyl secondary butyl N-methyl | Do. |
| Ethyl secondary butyl N-allyl | Do. |
| Ethyl secondary butyl N-phenyl | Glass-like solid. |
| Methyl secondary butyl N-methyl | 78–80° C. |
| Ethyl (1-ethyl propyl) N-methyl | Oil. |
| Methyl (1-ethyl propyl) N-methyl | Waxy crystals. |
| Ethyl (secondary butyl carbinyl) N-methyl | Oil. |
| Ethyl (2-ethyl butyl) N-methyl | 63–5° C. |
| Ethyl (β-brom allyl) N-methyl | 72–4° C. |
| Ethyl ethyl N-secondary butyl | 83–5° C. |
| Ethyl ethyl N-tertiary butyl | 98° C. |
| Secondary butyl allyl N-methyl | Oil. |
| Methyl (1-methyl butyl) N-butyl | Do. |

We claim as our invention:

1. A barbituric acid derivative, having the formula:

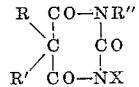

wherein R and R' are selected from the group consisting of saturated and unsaturated primary alkyl groups and saturated groups represented by the formula

wherein R''' and R<sup>IV</sup> are alkyl groups, R'' is selected from the group consisting of saturated and unsaturated primary, secondary and tertiary alkyl groups free from aryl substituents, at least one of the groups represented by R, R' and R'' being selected from the group consisting of secondary and tertiary alkyl groups, and X being selected from the group consisting of hydrogen and alkali forming groups.

2. A barbituric acid derivative, having the formula:

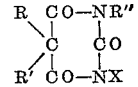

in which R is a primary alkyl group, R' is a saturated alkyl group represented by the formula

wherein R''' and R<sup>IV</sup> are alkyl groups, R'' is an alkyl group free from aryl substituents, and X is selected from the group consisting of hydrogen and alkali forming groups.

3. A barbituric acid derivative, having the formula:

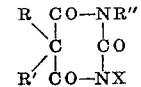

in which R is a straight chain hydrocarbon group, R' is a saturated alkyl group of the type

wherein R''' and R^IV are alkyl groups, R'' is an alkyl group free from aryl substituents, and X is selected from the group consisting of hydrogen and alkali forming groups.

4. A barbituric acid derivative, having the formula

in which R is a straight chain hydrocarbon group, R' is a saturated alkyl group of the type

wherein R''' and R^IV are alkyl groups, and X is selected from the group consisting of hydrogen and alkali forming groups.

5. A barbituric acid derivative, having the formula:

in which R is a straight chain hydrocarbon group, R' is a secondary alkyl group containing three to five carbon atoms, and X is selected from the group consisting of hydrogen and alkali forming groups.

6. A barbituric acid derivative, having the formula:

in which R is a straight chain hydrocarbon group, R' is a secondary alkyl group containing three to five carbon atoms, R'' is an allyl group, and X is selected from the group consisting of hydrogen and alkali forming groups.

7. A barbituric acid derivative, having the formula:

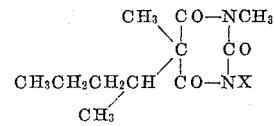

in which X is selected from the group consisting of hydrogen and alkali forming groups.

8. A barbituric acid derivative, having the formula:

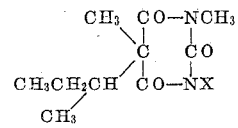

in which X is selected from the group consisting of hydrogen and alkali forming groups.

9. A barbituric acid derivative, having the formula:

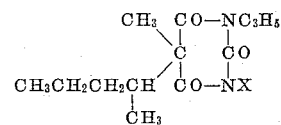

in which X is selected from the group consisting of hydrogen and alkali forming groups.

10. Barbituric acids having the formula

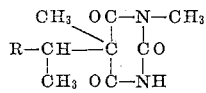

where R is a saturated alkyl radical.

ERNEST H. VOLWILER.
DONALEE L. TABERN.